United States Patent
Coelho et al.

(10) Patent No.: US 7,209,029 B2
(45) Date of Patent: Apr. 24, 2007

(54) ELECTRONIC LOCK SYSTEM AND METHOD FOR PROVIDING ACCESS THERETO

(75) Inventors: Jean-Louis Coelho, Town of Mount-Royal (CA); Yves Messier, Dollard-des-Ormeaux (CA); Eric Guérard, St-Jean-sur-Richelieu (CA)

(73) Assignee: Kaba Ilco, Inc., Montréal, Québec (CA)

( * ) Notice: Subject to any disclaimer, the term of this patent is extended or adjusted under 35 U.S.C. 154(b) by 325 days.

(21) Appl. No.: 10/856,774

(22) Filed: Jun. 1, 2004

(65) Prior Publication Data

US 2005/0264397 A1 Dec. 1, 2005

(51) Int. Cl.
- H04Q 9/00 (2006.01)
- G08B 5/22 (2006.01)
- H04K 1/00 (2006.01)
- G06Q 10/00 (2006.01)

(52) U.S. Cl. ............ 340/5.26; 340/5.28; 340/5.7; 340/5.6; 340/5.54; 340/825.29; 705/5; 705/18; 380/270; 380/281; 380/284

(58) Field of Classification Search ........... 340/5.73, 340/5.6, 5.26, 5.54, 5.28, 5.5, 825.29, 5.7; 705/5–6, 18; 380/270, 281, 284; 713/182, 713/183, 237
See application file for complete search history.

(56) References Cited

U.S. PATENT DOCUMENTS

| | | | |
|---|---|---|---|
| 5,591,950 A | 1/1997 | Imedio-Ocana | |
| 5,638,646 A * | 6/1997 | Shane | 52/79.1 |
| 6,950,944 B2 * | 9/2005 | Yager et al. | 380/274 |
| 2001/0034623 A1 | 10/2001 | Chung | |
| 2001/0342760 | 12/2001 | Koji et al. | |
| 2002/0031228 A1 | 3/2002 | Karkas et al. | |
| 2003/0132289 A1 | 7/2003 | Jacobi et al. | |
| 2004/0133476 A1 | 7/2004 | Kim | |

* cited by examiner

*Primary Examiner*—Jeffery Hofsass
*Assistant Examiner*—Scott Au
(74) *Attorney, Agent, or Firm*—Ogilvy Renault, LLP

(57) ABSTRACT

A method for providing a security code comprises providing an access location identification and security device information. A user provides access location information and access duration information to a code generator system. The access location information and access duration information is encrypted to provide an access code. The user provides a user token data to the code generator system, such that the access code is encrypted using the user token data to provide a security code. The security code is dispatched to the user.

16 Claims, 4 Drawing Sheets

ELECTRONIC LOCK SYSTEM AND METHOD FOR PROVIDING ACCESS THERETO

FIELD OF THE INVENTION

The invention relates to electronic lock systems of the type used for controlling access to hotel rooms and to a method for controlling access thereto.

BACKGROUND OF THE INVENTION

The advent of electronic lock systems has revolutionized the hotel industry by offering a safe and efficient way of controlling access to hotel rooms. Typical electronic lock systems function with electronic key cards and are controlled by computer systems. Upon checking in at the front desk of the hotel and being assigned a room, a customer is given an electronic key corresponding to the electronic lock securing access to the room. Electronic key cards have attached magnetic strips that are coded by the computers at the hotel check-in desk. The encoding on each key is such that the key functions only on a specific hotel room door. New keys with new codes are created for each room after the departure of each guest. The code from the previous use is erased by the computer, a new pattern is magnetically encoded on the key and the door lock is programmed to recognize the new code.

While prior art electronic lock systems offer many advantages over traditional key systems, they still suffer from significant drawbacks both for the hotels and for their guests. Customers arriving at a hotel are still required to check in at the front desk in order to be assigned a room and given the key. Many times, they are faced with long line-ups or staff unavailability, which decrease their satisfaction and minimize the chances of repeat business. For the hotel, adequate check in service and staff availability are very costly.

There exists therefore a need for a system and a method that would allow guests to arrive at a hotel and go straight to their room without having to use the services and the keys provided at the front desk.

Furthermore, the security issue arises for certain customers using the electronic keys provided by the hotel. The electronic key is impersonal and does not contain information that would make it work only for a unique authorized user. In the case in which a key is lost, the front desk can provide another one upon request, which makes the system prone to fraud and abuse. Customers therefore do not feel that they themselves or their belongings are safe at all times. Hotels are forced to increase security measures in other ways, for example by using video cameras for lobby surveillance and by stiffening identification requirements for obtaining keys.

There exists therefore a need for a system and a method allowing user specific information to be used for providing access to a hotel room.

SUMMARY OF THE INVENTION

Accordingly, an object of the present invention is to provide a more convenient way for customers of booking and reserving rooms, which would enhance customer appreciation.

It is another object of the present invention to provide a system offering an enhanced sense of security to guests by using customer specific information.

It is yet another object of the present invention to provide a system and a method allowing to reduce staffing requirements at hotel front desks.

Furthermore, it is another object of the present invention to provide a system and a method that would enhance hotel loyalty programs to give hotels a business competitive edge.

According to a first broad aspect of the present invention, there is provided a method for providing a security code comprising, providing access location identification and security device identification; a user providing access location information and access duration information; encrypting the access location information and access duration information to provide an access code; a user providing a user token; encrypting the access code using the user token data to provide a security code; and providing the security code to the user.

According to a second broad aspect of the present invention, there is provided a method for controlling a state of an electronic lock system comprising providing a security code to the electronic lock system; providing a user token to the electronic lock system; using the user token to decrypt an access code from the security code; and verifying the validity of the access code for the electronic lock system to determine a state of the electronic lock system.

According to yet another broad aspect of the present invention, there is provided an electronic lock system comprising, input means for receiving a security code and a user token; a processor unit for decrypting an access code from the security code and the user token, checking the validity of the access code and determining a state of the locking device according to the checking, a lock mechanism driver receiving the state and being controlled by same; and a memory unit in communication with the input means and with the processor unit.

BRIEF DESCRIPTION OF THE DRAWINGS

These and other features, aspects and advantages of the present invention will become better understood with regard to the following description and accompanying drawings wherein.

DETAILED DESCRIPTION OF THE INVENTION

Figure 1:
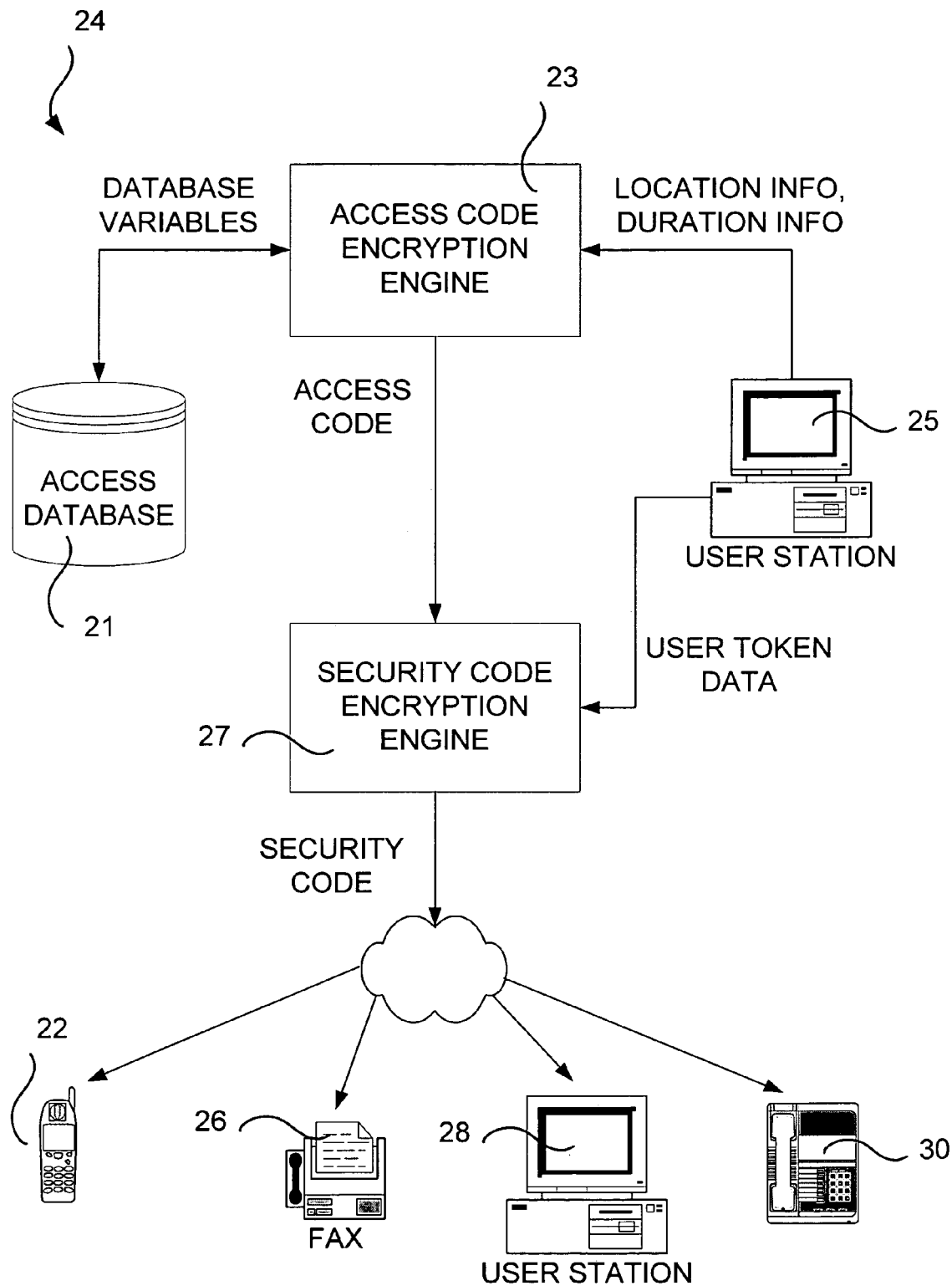
FIG. 1 is block diagram of a system for providing a security code according to a preferred embodiment of the present invention.

An encryption system 24 for providing a security code for accessing an electronic lock according to the preferred embodiment of the present invention is illustrated in FIG. 1. Such a system comprises an access database 21, an access code encryption engine 23 and a security code encryption engine 27. The encryption system 24 is in communication with a user station 25. The station 25 and the encryption system 24 communicate via any suitable transmission media, such as an ordinary public telephone line, a data quality line, a radio link or any other transmission media suitable for inter-computer communication. For exemplary purposes, only one user station 25 is shown, although it is to be understood that a plurality of user stations 25 could communicate with the encryption system 24.

The access database 21 contains information regarding a plurality of remote electronic lock devices at a plurality of locations. For each electronic lock device, information such as electronic lock device identification, electronic lock device location, etc. could be stored. The database 21 comprises a real time clock synchronized with the clocks installed in each remote electronic lock device. This synchronization ensures the validity of access codes produced for each remote electronic lock device. The access database contents are used together with information provided by the user, such as choice of location, start date, end date, etc. to provide an access code.

In the preferred embodiment of the present invention, the access database 21 contains database variables, such as: site codes, user-level encryption keys per lock, user-level privileges per lock, code sequence number, real-time clock reference, etc. These variables are common between the database of a specific location and the electronic lock device at that location. The site codes are codes associated with each electronic lock device at a given location. The user-level encryption keys provide different encryption levels for a same electronic lock device. The user-level privileges can include privileges for overriding a deadbolt, etc. The code sequence number is a number assigned to an access code, when this access code is provided during the validity period of a previous access code. The code sequence number will allow the latest access code to cancel the previous access code.

When the user provides a choice of location, such as a preferred hotel, and stay information, such as a check-in date and a length of stay, the database will communicate with the given hotel property management system (PMS) and will retrieve an available room for that stay period. Then, the database will retrieve the variables associated with the electronic locking device controlling access to that room, and will use the variables, together with a pre-determined access level for the guest, to encrypt an access code.

In the preferred embodiment, the user station 25 is a personal computer, but could also be some other type of communication device, such as an Internet-enabled cell phone. Rooms can be reserved through a web browser, such as, for example, a Microsoft Internet Explorer browser. A server manages user information and access to the reservation system, such that only registered users may access its contents. A registered user will have to provide credential information, such as a username and a password, in order to be identified by the server. If the provided user information is valid, the corresponding user home page is accessed, according to the specified user profile. If the information is found to be invalid, an error message may be generated or the system may prompt the user to re-enter new credential information.

The server comprises an access code encryption engine 23 for encrypting an access code based on information received from the user 20 and from information from the access database 21. The server also comprises a security code encryption engine 27 which provides a security code from the access code and a user token data. The security code is used to access an electronic lock system at a remote location.

Figure 2:
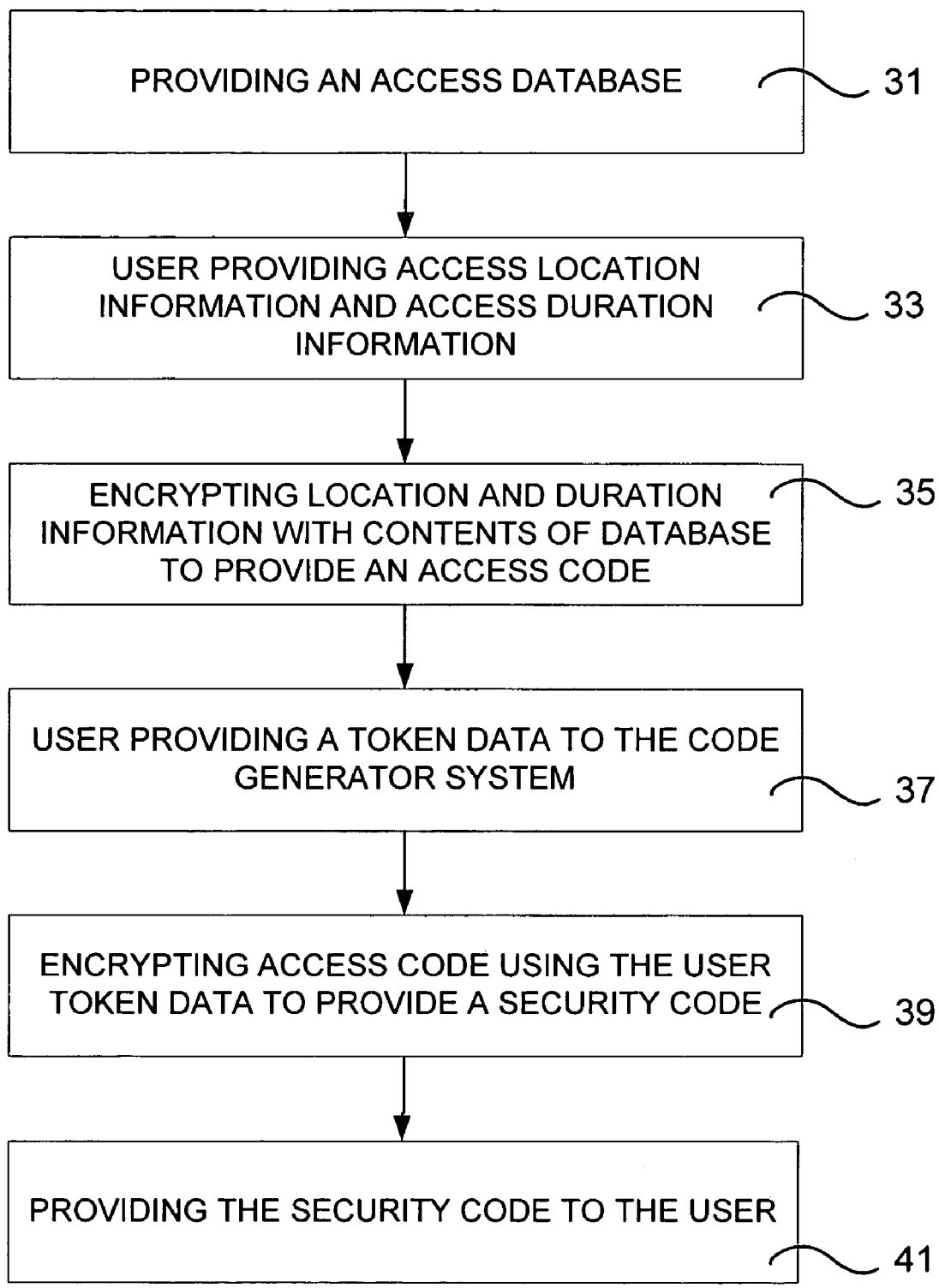
FIG. 2 is a flow chart of a method for providing a security code according to a preferred embodiment of the present invention.

A method for providing a security code will now be described referring to FIG. 2. In a first step 31, an access database 21 is provided. The access database 21 provides encryption keys and other information as described above, to the access code encryption engine 23 upon request.

In a next step 33, a user provides access location information and access duration information. In the preferred embodiment of the present invention, the user provides stay information such as the choice of hotel location, the type of room desired and access duration information. The access duration information may include the access start date and the access end date or the access start date and a period of time for which access is desired.

The information provided by the user 20 is received by the access code encryption engine 23, which, in step 35, encrypts location and duration information with encryption keys retrieved from the access database 21.

In a next step 37, the user 20 then proceeds to provide a user token data. The user token data is information such as a credit card number, which can later be read from the card.

The security code encryption engine 27 receives the access code from the access code encryption engine 23 and the user token data and encrypts them to provide a security code in step 39.

In step 41, the security code is provided to the user either immediately or at any time prior to the expiration of the access period. The user may receive the security code at a computer station 28, at a phone station 30, on a fax machine 26 or on a cellular phone 22. The security code may be dispatched through a plurality of communication methods, such as electronic mail, voice mail, facsimile, kiosk, small messaging service (SMS), wired access protocol (WAP) or other modern wired and wireless data transfer methods and services.

Figure 4:
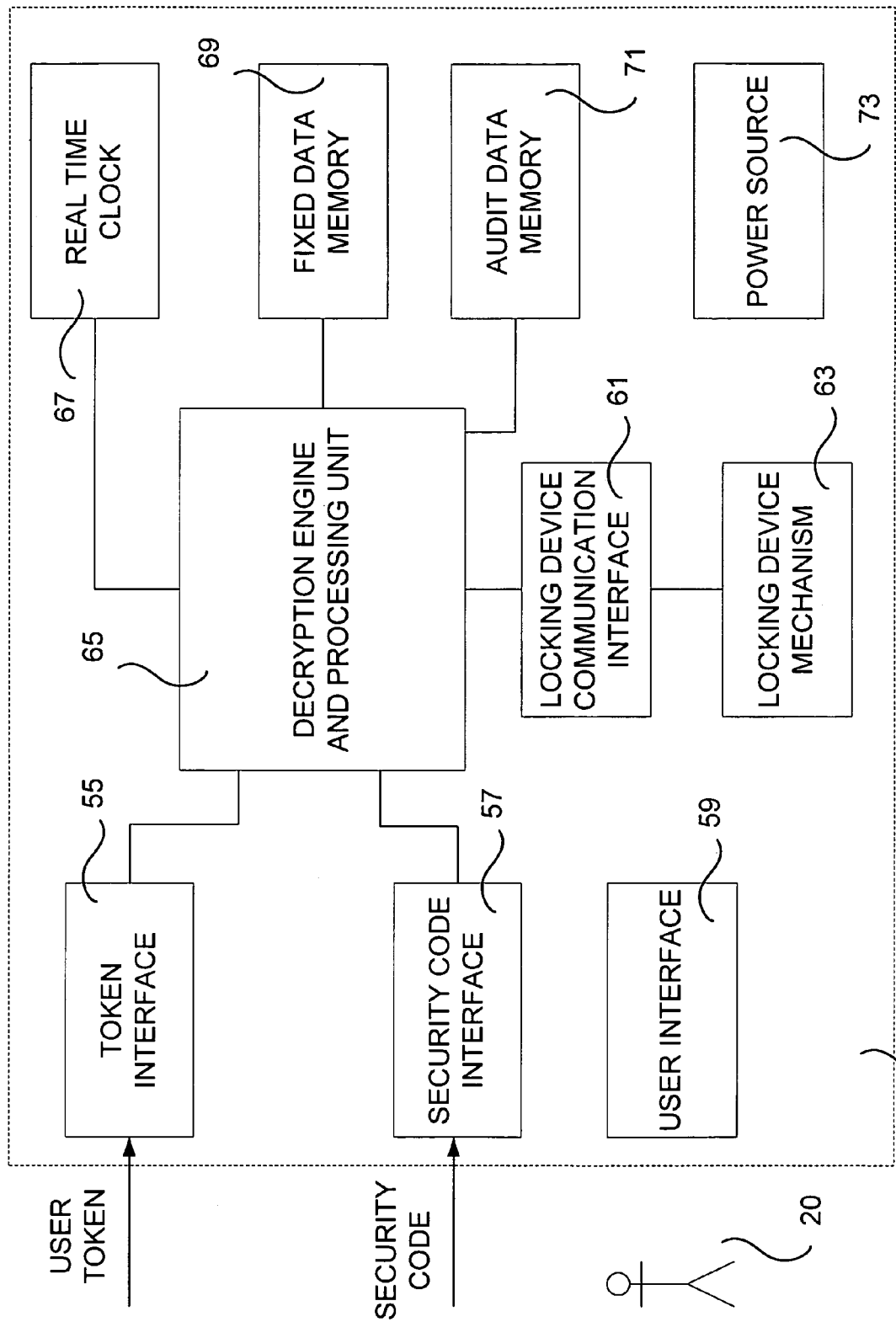
FIG. 4 is a block diagram of an electronic lock system according to a preferred embodiment of the present invention.

Now, in reference to FIG. 4, an electronic lock system 53 will be described. The electronic lock system 53 comprises a token interface 55 for receiving a user token, a security code interface 57 for receiving a security code and a general user interface 59 for providing feedback to the user 20.

The user token interface 55 comprises a card reader for reading information encoded on a user token. The user token to be used in the preferred embodiment of the present invention is preferably a credit card. Any ABA Track II type card, such as credit cards and VIP cards, may be used. Alternatively, the card reader can also read IATA format information recorded on cards issued at the Front Desk Unit.

In the preferred embodiment, the card reader includes magnetic read heads for reading information encoded magnetically. Alternatively, the cards may be coded optically or may use any other electrical variable or property, such as resistance, capacitance, etc.

The card reader is adapted for inserting a user token card in order to read the encoded information. Insertion is sensed by a card-in sensor means, such as a switch (logical or physical) which is tripped by the card as it is being inserted. The tripping of the switch activates the decryption engine and processing unit 65, as wells as the card reader, which otherwise would not be active. The card reader includes a magnetic head for reading the information encoded on the various slots of the card. In alternative embodiments, it is possible that a swipe reader or an RF proximity reader be used.

It is to be understood that it is within the scope of the present invention that other types of user tokens and associated readers may be used. For example, a proximity tag user token, containing fixed or programmable memory, may communicate by RF means in close proximity to a RF reader. The proximity tag microprocessor would be powered by the RF field generated by the RF reader. Such a proximity tag user token can take on many shapes and sizes, including, but not limited to: ISO style keycard, keyfob, a watch, a pool tag, etc.

Alternatively, a biometric user token may be used including a biometric signature such as a fingerprint, iris pattern, voice recognition, face recognition, etc. The biometric signature can be encrypted into a relatively small digital form. The biometric reader would use in each case the appropriate interface for reading and communicating the signature to the processing unit 65. Examples of interfaces include: optical, capacitive, auditory sensor, visual sensor, etc.

After the user token information has been read from the user token card, the information is stored in a user token register in memory 69 for later use. Before storage, the decryption engine and processing unit 65 verifies however that the user token type and the provided user token information are valid.

The user 20 then provides a security code to the security code interface 57 of the electronic lock system 53. The provided security code is temporarily stored in a security code register in memory 69.

Alternatively, the user 20 could provide the security code in a first step and the user token in a second step.

The decryption engine and processing unit 65 then reads the security code from the security code register and the user token information from the user token register and decrypts the security code using the user token information. The decrypted security code provides an access code and parameters regarding the validity of the access code. Before performing any unlocking functions, the decryption engine and processing unit 65 validates the access code by checking that it is not expired, i.e. that the time of use is between the start date and end date parameters. The validation is performed using time information provided by the real time clock 67. The decryption engine and processing unit 65 then extracts from the access code information allowing it to determine whether the access code is indeed for the electronic lock system 53 for which it is being used.

The information extracted from the access code also includes a user level code.

The user level codes correspond to different access levels, such as master keys, supervisor keys, guest keys, as well as other designated keys. The user level codes are stored in the memory unit 69 of the electronic lock system 53. Hotel personnel is preferably provided with cards of a higher access level than regular guests. For security reasons, it is desirable that hotel personnel be provided cards that open only those rooms which are assigned to them. Hotel personnel supervisors may be issued supervisor cards of a level higher that could open, for example, all rooms to which a particular group of hotel staff has access to. Still higher level cards, such as master cards, could be created to be used for maintenance purposes, or in case of an emergency, such as a fire.

In the preferred embodiment of the present invention, the lock provides 8 levels of access. The number of possible access levels is a function of the number of bits used to select the access level. For example, if 3 bits are used to designate the access level, then there are $2^3=8$ different possible access levels.

If the decrypted access code is correct, then the information stored on the ABA track of the user credit card is stored in memory 69, together with the associated parameters, access start date, access duration and access level.

The electronic lock system 53 also provides a way of enrolling additional user tokens for accessing the room, which are attributed the same access period as determined from the encrypted security code. In order to enroll an additional user token, the valid user token is presented to the electronic lock system 53 so that it may be read. Then, the user presses a key, such as, for example, the # key on the security code interface 57. The user then can present to the electronic lock system the additional card to be enrolled. For security reasons, the additional card to be enrolled will have to be presented within a limited time frame from the time the key # is pressed. The information on the additional card is then stored in memory 69 as a link to the original user token.

At the end of the access period, the electronic lock system 53 automatically expires the token access code, the encrypted security code, as well as the additionally enrolled tokens.

Figure 3:
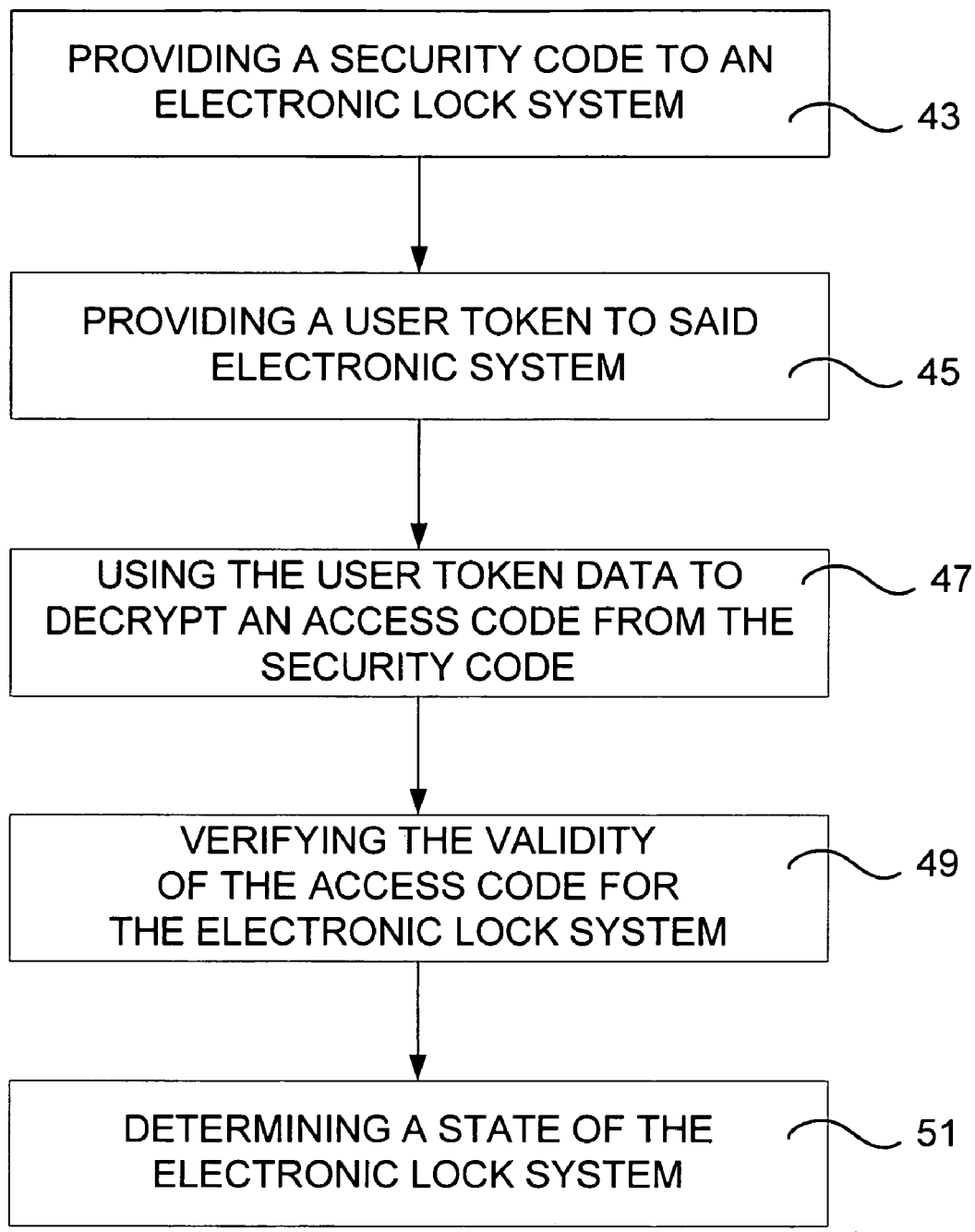
FIG. 3 is a flow chart of a method for controlling a state of an electronic lock system according to a preferred embodiment of the present invention.

A method for controlling a state of an electronic lock system 53 will now be described referring to FIG. 3. In a first step 43, a user 20 provides a security code to the electronic lock system 53. The user then provides in a next step 45 a user token data to the electronic lock system 53. Alternatively, the user 20 could first provide the user token data and then the security code.

The electronic lock system 53 uses the user token data in a step 47 to decrypt an access code from the provided security code. Following decryption, the electronic lock system 53 then verifies, in a next step 49, the validity of the access code for the electronic lock system 53. Finally, in another step 51, the electronic lock system 53 determines a state, i.e., open or closed, for the electronic lock based on the validity check.

The electronic lock system 53 also comprises a power source 73 and an audit data memory 71. The audit data memory 71 records information regarding the times the electronic lock system 53 was accessed. The audit data memory 71 consists of non-volatile memory, having the ability to conserve its data even when power source 73 is shut off. Each time the electronic lock system 53 is accessed, data pertaining to the access event is stored in the audit memory. The access event data stored can include user level of access, a timestamp (including time and date), whether access was granted or not, whether a privacy switch was activated, etc.

The audit data may be retrieved from the electronic lock system 53 by the owner of the electronic lock system 53.

It will be understood that numerous modifications thereto will appear to those skilled in the art. Accordingly, the above description and accompanying drawings should be taken as illustrative of the invention and not in a limiting sense. It will further be understood that it is intended to cover any variations, uses, or adaptations of the invention following, in general, the principles of the invention and including such departures from the present disclosure as come within known or customary practice within the art to which the invention pertains and as may be applied to the essential features herein before set forth, and as follows in the scope of the appended claims.

What is claimed is:

1. A method for providing a security code, comprising:
    providing access location identification and security device information;
    a user providing access location information and access duration information;
    encrypting said access location information and access duration information to provide an access code;
    a user providing a user token data;
    encrypting said access code using said user token data to provide a security code; and
    providing said security code to said user.

2. A method as claimed in claim 1, wherein said providing said security code to said user is performed through electronic means.

3. A method as claimed in claim 2, wherein said electronic means comprise at least one of electronic mail, SMS, facsimile and direct user interface.

4. A method as claimed in claim 1, wherein said providing access location identification and security device information comprises providing an access database storing said access location identification and security device information and wherein said providing an access code and said providing a security code are performed by a code generator system in communication with said access database.

5. A method as claimed in claim 1, wherein said security code is provided to said user at a predefined time before usage.

6. A method as claimed in claim 1, wherein said security device comprises a remote electronic lock system, said method further comprising using said security code for accessing said remote electronic lock system.

7. A method as claimed in claim 6, wherein said user token comprises at least one of a magnetic strip card, a smart card and a user biometric measure.

8. A method as claimed in claim 1, wherein said providing an access code comprises encrypting said access code using user privilege level information.

9. A method for controlling a state of an electronic lock system comprising:
   providing a security code to said electronic lock system;
   providing a user token to said electronic lock system;
   decrypting said security code to obtain an access code using said user token;
   decrypting said access code to extract validation information; and
   verifying the validity of said access code for said electronic lock system to determine a state of said electronic lock system using said validation information.

10. A method as claimed in claim 9, wherein said verifying the validity of said access code comprises:
   extracting access code information and lock identification information from said validation information
   verifying that said access code information is valid for a current time; and
   verifying that said lock identification information identifies said electronic lock system.

11. A method as claimed in claim 9, further comprising producing a security code by encrypting stay information with said user token.

12. A method as claimed in claim 11, wherein said stay information comprises access duration information and access location information.

13. A method as claimed in claim 9, further comprising auditing user access to said electronic lock system.

14. An electronic lock system, comprising:
   input means for receiving a security code and a user token;
   a processor unit for decrypting said security code to obtain an access code using said user token, decrypting said access code to extract validation information, checking the validity of said access code and determining a state of said locking system using said validation information and according to said checking;
   a lock mechanism driver receiving said state and being controlled by same; and
   a memory unit in communication with said input means and with said processor unit.

15. An electronic lock system as claimed in claim 14, wherein said input means comprises at least one of a key pad, a magnetic reader, an optical reader, an IR reader and an RF detector.

16. An electronic lock system as claimed in claim 15, further comprising a real time clock for determining validity of said access code.

* * * * *